Oct. 14, 1930. H. B. LEE Re. 17,824

EROSION REDUCING VALVE

Original Filed Oct. 26, 1926 2 Sheets-Sheet 1

Inventor:
Henry B. Lee

By his Attorney
Philip Parnsworth

Oct. 14, 1930. H. B. LEE Re. 17,824

EROSION REDUCING VALVE

Original Filed Oct. 26, 1926 2 Sheets-Sheet 2

Inventor:
Henry B. Lee
By his Attorney
Philip Parnsworth

Reissued Oct. 14, 1930 Re. 17,824

UNITED STATES PATENT OFFICE

HENRY B. LEE, OF NEW LONDON, CONNECTICUT

EROSION-REDUCING VALVE

Original No. 1,645,601, dated October 18, 1927, Serial No. 144,262, filed October 26, 1926. Application for reissue filed July 20, 1929. Serial No. 379,860.

This invention relates to an improvement in valves and particularly to valves for controlling the flow of expansible fluids, such as steam, though not so limited.

Generally, as heretofore constructed, valves have not only been extremely noisy when employed for controlling high-pressure expansible fluids, but have also been subject to the rapid and destructive erosion of their valve-seats, owing to the high velocity at which such high-pressure elastic expansible fluids tend to flow through a restricted opening.

The object of this invention is to produce an expansible fluid valve in which erosion is substantially reduced or prevented.

A further object is to produce a valve which shall function with the minimum of noise.

With these objects in view, the exemplary embodiment of my invention consists in an erosion-reducing valve characterized by its provision with a male member and a co-acting female member constructed and arranged so as to form between them a flow-passage having a progressively-increasing area of flow from its inlet-end to its outlet-end; one of the said members being formed with a series of alternate flanges and expansion-chambers and one of the said members being movable with respect to its co-acting member, whereby the passage past each flange may be coincidentally varied and the velocity of the fluid reduced as a result of the resulting successive reductions of pressure.

Figure 1:
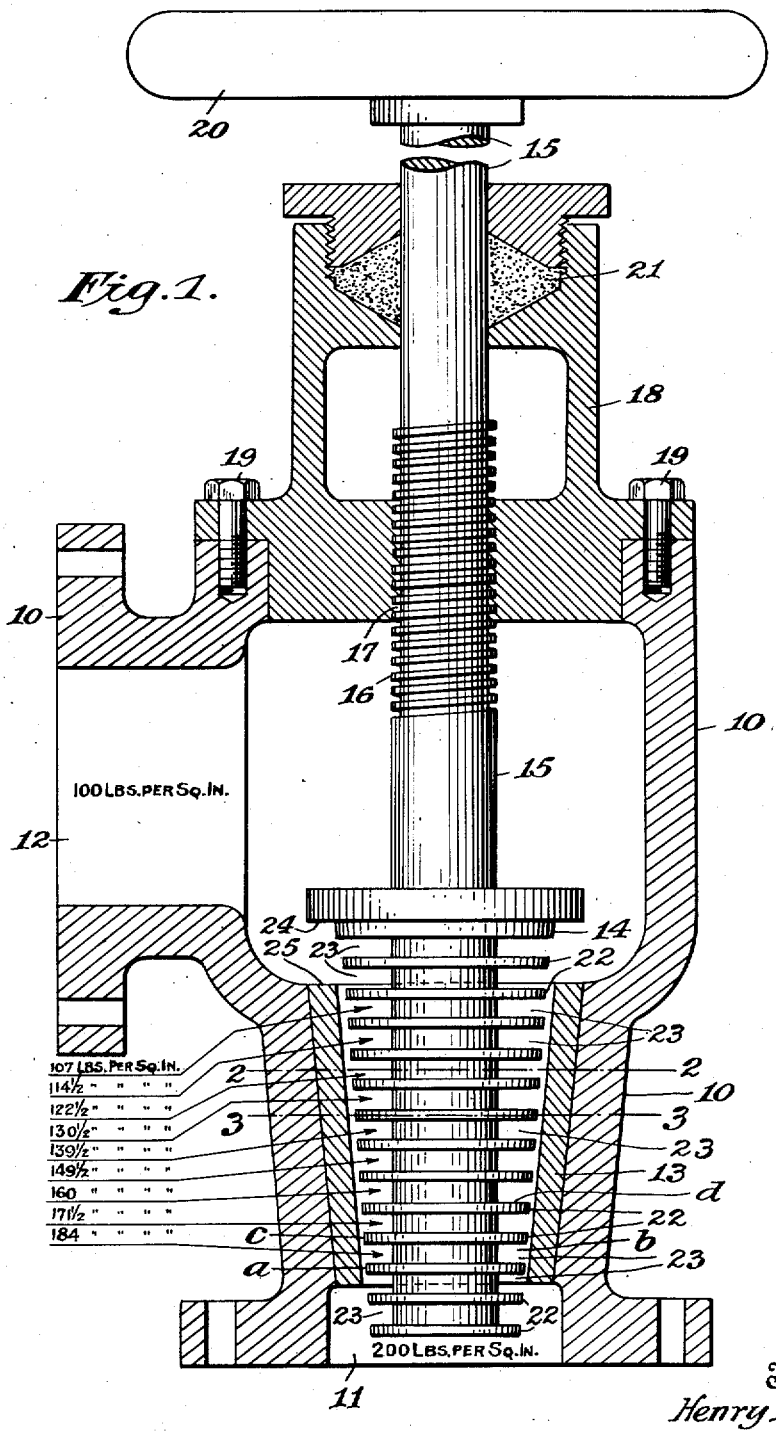
Fig. 1 is a central longitudinal sectional view of an erosion-reducing valve constructed in accordance with my invention.
Figure 2:
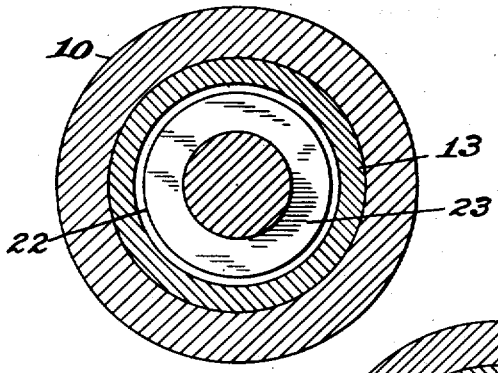
Fig. 2 is a transverse sectional view on the line 2—2 of Fig. 1.
Figure 3:
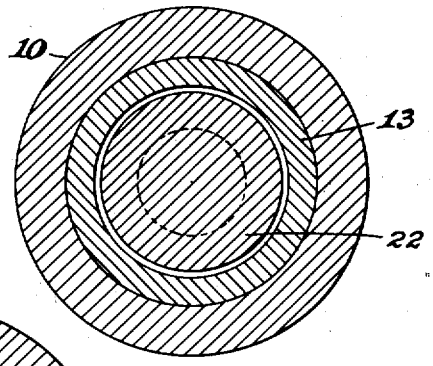
Fig. 3 is a transverse sectional view on the line 3—3 of Fig. 1.

In carrying out my invention, as shown in Figs. 1 to 3 inclusive, I employ a valve-casing 10 having an inlet-port 11 and an outlet-port 12. Axially in line with the inlet-port and in the lower end of the casing 10, I mount a conical tube-like female member or thimble 13 having a smooth interior wall and adapted to receive an axially adjustable conical male member. For the purpose of axially adjusting the closure with respect to the thimble 13, the same is mounted upon the lower end of a valve-stem 15, which is formed with external threads 16 engaging corresponding internal threads 17 formed in a cap-member 18, which latter, as shown, is secured to the upper end of the valve-casing 10 by means of bolts 19. The valve-stem 15 aforesaid is provided at its upper end with a hand-wheel 20 and extends through a packing-gland 21 in the cap-member 18.

For preventing undesired use of the velocity of the steam or other elastic expansible fluid expanding between the inlet-port 11 and the outlet-port 12, the male conical member above described is formed with a series of regularly-alternating annular flanges 22 and annular expansion-chambers 23. A sealing-flange 24, 14 at the upper end of the conical member is adapted to co-act with the upper end 25 of the thimble 13, when it is desired to completely stop the flow of the expansible fluid as steam through the valve.

Figure 5:
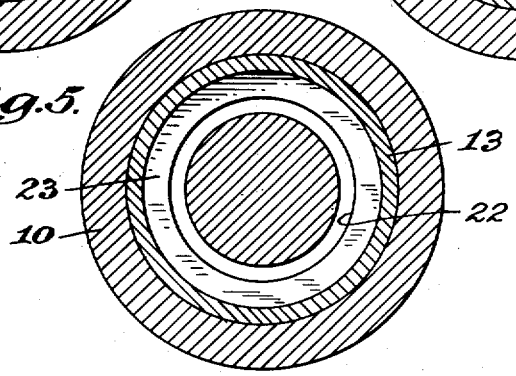
Fig. 5 is a transverse sectional view on the line 5—5 of Fig. 4.
Figure 4:
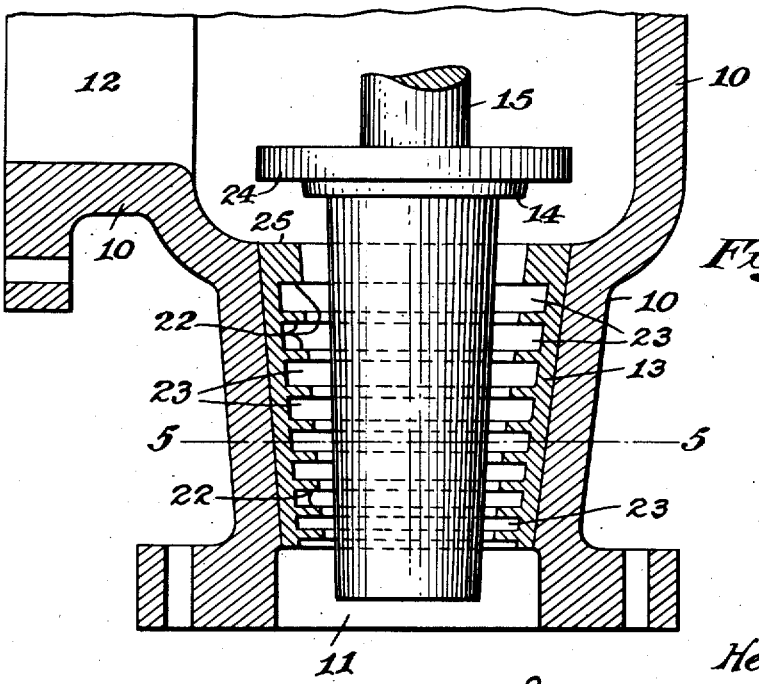
Fig. 4 is a broken central longitudinal sectional view of a modified form which my invention may assume.

Instead of forming the flanges 22 and expansion-chambers 23 upon the male member, they may be formed upon the inner face of the female member or thimble, as clearly shown in Figs. 4 and 5.

According to the well-known laws governing the flow of steam, its velocity through an orifice adjusted to reduce its pressure from 200 lbs. per square inch to 100 lbs. per square inch, for example, as in Fig. 1, would be approximately at the rate of 1,675 feet per second, which would be the velocity of the steam flowing between the inlet 11 and outlet 12, were it not for the interposition of the flanges 22 and expansion-chambers 23, as described. Steam flowing at such a velocity as this would not only cause excessive noise, but would also cause the rapid erosion of the walls of the orifice such as the valve seat and plug. By my invention, since velocity is dependent upon pressure, the prevention of undesired use of the velocity is effected by reducing the pressure in two or more steps, instead of in one step. Since the difference in pressure between two points determines the velocity of flow between them, it follows, therefore, that a relatively slight reduction in pressure results in but slight velocity.

Presuming, for the purpose of description, that a steam pressure of 200 lbs. per square inch exists in the inlet-port 11, as indicated in Fig. 1, and that the male member has been properly proportioned and adjusted with respect to the female member 13, so as to permit sufficient steam to pass to maintain a pressure of 100 lbs. per square inch in the outlet-port 12, the functioning of my improved erosion-reducing valve may be described as follows:

The flanges 22, appropriately proportioned will act as follows:

The flange "*a*," in conjunction with the adjacent wall of the female member 13, will step the pressure down from 200 lbs. to 184 lbs. by the time it reaches the expansion-chamber "*b*," and will, therefore, only have been exposed to the action of steam moving at the relatively-low velocity of 570 feet per second. The flange "*c*" will serve to step the pressure down from 184 lbs. to 171½ lbs. and would, also, be subjected only to the action of steam moving at the rate of 570 feet per second. This step-by-step reduction in pressure will be continued by the successive flanges, as indicated in Fig. 1 of the drawings, until, by the time the steam reaches the outlet-port 12, it will have been reduced to 100 lbs. per square inch. This reduction in pressure from 200 to 100 lbs. will thus have been accomplished without having subjected any part of the valve to the action of steam moving at any greater velocity than 570 feet per second as compared with 1,675 feet per second which would have been the velocity, were it not for the interposition of the flanges 22 and chambers 23, with the result that erosion is avoided and silent action obtained, for I have found that at said steam velocity there will be substantially no objectionable erosion either at the sealing-flange 24, 14 or at any of the flanges 22 or at the portions of the smoothly continuous wall of the female member 13 adjacent said flanges, so that the valve of Fig. 1 will have a longer useful tight-sealing life than prior valves controlling expansible fluids. The above description of operation all relates, as first above stated, to the steam action at the half-open position to which the valve is adjusted by stem 15 as shown in Fig. 1, with the exemplary total pressure-drop from 200 to 100 lbs. at that adjustment, and at a time when the sealing flange 24 or 14 nearest outlet-port 12 is quite widely separated from its seat against female member 13 so that on account of such wide separation it is not liable to excessive erosion. But in said half-open position of sealing-flange 24 or 14 or both, the flanges supplemental thereto and inside member 13 yet are so close to smooth wall 13 that they yet are throttling the steam (i. e., from 200 to 100 lbs.), and therefore they would be subjected to high steam velocity and correspondingly rapid erosion but for the above expansion-limiting action of the multi-stage flow-passages past these very flanges 22 which as first above stated are of progressively increasing flow-area from the inlet-end of the valve to its outlet-end, altho for said definite expansion-limiting action, the successive steps or stages have the very definite relations to one another shown in Fig. 1, for the purpose of causing said definite action. In the half-open valve position shown in Fig. 1, the useful effect of the multi-staging in protecting from erosion the sealing-flange 24, 14 and its seat on 25, 13 is due to the fact that the throttling is being done now, as shown, not by half-open flange 24, 14, but by the multi-stage structure 13, 22, 23 below it; the flange 24, 14 itself being permitted thereby to be moved to its position shown, i. e., beyond a throttling position where it would be subjected to undesirable erosion. As will be seen hereafter, the flange 24, 14 is protected also by 13, 22, 23 when it is first separated from its seat 25, 13; but with reference to the half-open position shown in Fig. 1, when, as just stated, the valve-throttling is being effected by the supplemental structure 13, 22, 23, the latter would be undesirably eroded but for the above definite expansion-limitation by the cooperative action of the successive steps or stages. Thus my special step-by-step erosion-reducing method is needed and is employed in this valve-position shown in Fig. 1, for the purpose of protecting from erosion the additional supplemental flanges 22 themselves which yet lie within member 13, and to protect the adjacent portions of the wall 13 which yet are faced by the latter flanges, all of which previously have served to protect flange 24, 14 when it was first separated from 25, 13. Thus the parts of the multi-stage structure 13, 22, 23 which yet remain inside female member 13, when 24, 14 is as wide open as shown in Fig. 1, are kept free from undesirably rapid erosion for a longer period of service than heretofore and therefore able to continue for such longer period the prime function of 13, 22, 23 of protecting from erosion the sealing flange 24, 14 and its seat on wall 13 both when said sealing-flange is first opened and when it is in its non-throttling position shown in Fig. 1, and therefore in all positions of adjustment within the range of any particular design of valve embodying the principles of the invention. The times when sealing-flange 24, 14 and its seat heretofore have been subject to erosion are when it is first opened or when it is adjusted to open positions much nearer to closed position than the position shown in Fig. 1, and in such cases the operation of the multi-staging 13, 22, 23 is similar to that first above described as to the half-open position shown, owing to the illustrated rather small angle between the smoothly continuous inner wall of member 13, Fig. 1, relative to the axis of adjusting movement by stem 15; but then the multi-stage action not only continues to protect from erosion the multi-stage structure 13, 22, 23 itself as in the position above in Fig. 1, but it also protects from erosion the sealing-flange 24, 14 and the adjacent portion of member 13, in their close relations to one another when they are cooperating with 13, 22, 23 in throttling the steam, i. e., when flange 24, 14 is so close to 25, 13 as to be subject to erosion. Thus, when the valve is closed, the sealing-flange 14 occupies the position shown in Fig. 1 as then occupied by the highest flange 22 lying inside member 13, save that then flange 14 is in its sealing position against smoothly continuous wall 13 as a seat and seal; and the chamber 23 next below flange 14 then at the sealing position of 14 occupies the space marked "107 lbs." in Fig. 1. Upon initial valve-opening ("cracked" valve-position) the annular passage between tapered sealing flange 14 and the like tapered inclined wall 13, Fig. 1, has a smaller width than the passage past the flange 22 lying next below said flange 14; but the diameter of the annular passage past 14 is larger, so that its total flow-area is slightly greater, causing the 107 lb. pressure in the chamber 23 next below sealing flange 14, but allowing the illustrated final partial expansion from 107 to 100 lbs. at outlet-port 12. This final slight expansion of 7 lbs. is accompanied by the above low velocity past sealing flange 14, 24 and its seat on member 13 so that at those surfaces erosion is substantially avoided as above, the action being the same also at each stage below flange 14 at said "cracked" position of the valve; i. e., at the several flanges 22 inside member 13 and at the portions of wall 13 adjacent them; so that, as above, no part of the valve is subjected to undesired high velocities, either the sealing-flange 24, 14 or any supplemental flange 22 or the portions of the wall of member 13 which lie adjacent said flanges at any adjustment of the valve to open position by way of valve-stem 15. Thus for the first time the matter of erosion is put under the control of the designer of a valve desired for use with given total pressure-drops of any given expansible fluid, in such wise that protection from erosion is afforded at the various positions of adjustment of the valve for delivery of various quantities of the given expansible fluid.

Now, since it follows that as the pressure is reduced, the volume of the steam is increased, the taper of the male member is, as shown, purposely made less than the taper of the female member, so that a progressively greater flow-area is provided by each successive flange from the inlet-end to the outlet-end. This difference of taper in the form shown in Fig. 4 is coincident with the fact, as shown therein, that the only sealing-flange for the valve is at 24, 14, while the differential taper is involved at each and all the supplementary flanges 22 on female member 13, so that none of said supplemental flanges ever makes contact with the smoothly continuous wall of the male member to close or seal the valve thereby, even when the valve is sealed in closed position at sealing-flange 24, 14. (In Fig. 4 the smoothly-continuous wall of the male member functions like the smoothly continuous inner wall in Fig. 1 of the female member, in respect of valve-adjustment to different positions to be described.) In the valve of Fig. 1, however, altho said differential taper is applied to the flanges 22 between flanges "*d*" and 14, nevertheless this form of valve in its position closed and sealed at 24, 14 is closed and sealed also at "*d*", (as may be seen from Fig. 1 by drawing a vertical line down from the periphery of "*d*", to the inner wall of female member 13), notwithstanding that the flanges 22 between "*d*" and 14 never make contact with said smoothly continuous inner wall 13 even when the valve is closed both at "*d*" and at 24, 14 as sealing flanges. As shown in both Figs. 1 and 4, however, the included angle of the female member 13 is rather small, (about 12 degrees as shown), i. e., the wall of member 13 is rather steep in this particular instance. This angle of said smoothly continuous wall (relative to the axis of adjustment by stem 15) is related, in respect to the above-described exemplary pressure-drop and the ideal stage-velocity of 570 feet per second for steam, to the number of stage-flanges and their individual construction relative to one another, all as shown in Fig. 1 and both relative to a given total pressure-drop, such as the 200 to 100 lb. drop shown, and all for the purpose of preserving the described step-by-step operation at the various positions of valve-adjustment. This angle of inner wall 13, Fig. 1, for any given number of stages (as ten of the fourteen shown in Fig. 1 always acting inside member 13 for the various different adjusted positions of valve-opening) is selected by the designer of a valve for any particular desired service, with respect to said number of stages, said number of stages being proportioned to a given total pressure-drop, and all and each of such stages being proportioned to such given total pressure-drop as an upper limit; and such angle of the smoothly-continuous wall is embodied in the construction, so as to impart the above adjustability to the structure which prevents the alteration of such constructed proportioning, at various different positions of valve-adjustment, particularly positions of the flanges 22, 14 close to said wall 13. Thus upon adjustment of the valve to different positions for different rates of quantity-flow of the expansible fluid, none of the successive flanges will be moved so far away from wall 13 as to cause such undesirably large stage-expansions and consequent undesirably high stage-velocities as will approximate too closely to the velocities at which erosion is undesirably rapid. Obviously, however, in all cases, there is an upper limit to the extent of valve-opening at which it is possible to preserve the above special step-by-step erosion-reducing low-velocity conditions of my invention, because after the multi-stage structure has been opened wide beyond the position where valves heretofore have eroded, the passages past the flanges nearer outlet-port 12 will be increased at a rate very much out of proportion to the passages past the flanges nearer inlet-port 11; but by such proportioning as is illustrated in Fig. 1 for example, in different valves adapted for different upper limits of pressure-drops, it is practicable in all cases to maintain said critical conditions of my invention over an amply sufficient range of adjusted positions of the valve, so that all parts of the valve as above will be protected from undesirably rapid erosion, not merely in one adjusted position but in all adjusted positions wherein protection from erosion is desirable. It is the smoothly continuous form of the inner wall of member 13 in Fig. 1 which, in connection with its angle relative to the axis of adjustment, causes said preservation of the constructed proportionings at the successive stages relative to a given total pressure-drop and corresponding number of stages; so that (1) from the initial opening of the valve at sealing-flange 14, (up to a desired upper limit of valve-opening) all the flange-passages are increased at substantially the same ratio for variation of quantity-flow and (2) at the same time the velocity-control is maintained substantially constant at each and all the several stages and positions of adjustment. This applies particularly to the initial opening of the valve as at sealing-flange 14 when the total pressure-drop between the valve-ports usually is greatest, and when the erosion at the several stages including the sealing-flange 14, therefore is most rapid, in the absence of the invention, on account of the proximity of a sealing-flange to its seat. For example, in Fig. 1 at the instant of initial opening, as distinguished from the first above described operation of my valve at the half-open position shown, the valve is opened by the movement of parts 24, 14 and "*d*" upward away from their closed positions sealing the valve by contact with female member 13. The main object of the invention is to protect the sealing-flange or sealing-flanges from undesirably rapid erosion during the time when they are most liable to erosion, i. e., when they are spaced only slightly from member 13. At the time of valve-opening, the flanges below flange "*d*" are not in operation because they lie below member 13 and outside of it; but all of flanges 14 and 22 down to and including flange "*d*", then lie inside member 13; and before valve-opening, the flanges 22 between 14 and "*d*" are slightly spaced from wall 13 (owing to the above differential taper of the male and female members) and therefore the valve is open past said flanges between 14 and "*d*" altho closed at flange "*d*" in advance of them. As the valve starts to open, the sealing-flange 24, 14 would be rapidly eroded by a large pressure-drop between the ports 11 and 12 if the valve were not provided with my special multi-stage structure; but in the presence of this structure, as the valve starts to open at "*d*" and 14, each upper flange-passage between 14 and "*d*" has its flow-area increased at a more rapid rate than the flange-passage next below it, which is proper in order to accommodate the flow of increased quantity (pressure-volume) of steam as the valve is opened beyond its initial slight opening. At this point, however, the angle of smoothly continuous wall 13 relative to the number of flanges 22, 14 and relative to the axis of adjustment by stem 15, keeps the successive flange-passages from increasing too rapidly relative to the flange-passages respectively next below them, as the valve opens wider, i. e., said wall 13 keeps the flow-areas of the flange-passages down to the sizes (as first above described for the step-by-step action at the open valve-position shown in Fig. 1) which keep the individual stage-expansions down in the example to the exemplary ideal average of 10 lbs. per stage, for steam, (and of course for the given total pressure-drop as an upper limit for which the valve is designed) at all positions of adjustment, with the corresponding ideally low velocity of 570 feet per second, for steam. Hence the adjustment by valve-stem 15, owing to this combination of male and female members proportioned with respect to one another as shown for the given total pressure-drop from 200 to 100 lbs., causes a coincident variation of the various flange-passages, which in turn causes true multi-stage operation in accordance with my invention, from the very beginning of valve-opening and as long as is necessary to protect sealing-flange 24, 14 from excessive erosion, i. e., as long as the valve is only partly open at 24, 14, and "*d*"; and as above, this action continues at 13, 22, 23 after 24, 14 has been widely separated from 25, 13 as shown in Fig. 1, so that then 13, 22, 23 protects itself from undesirably rapid erosion when such erosion otherwise would occur when flanges 22 were too close to wall 13. The form of Fig. 1 where the valve is sealed at one flange as "*d*" in addition to the top seal at flange 24, 14, is preferable to the form of Fig. 4 where the only sealing-flange is at 24, 14, because in Fig. 1, upon initial opening of the valve, and without excessively expensive care in the details of construction in order to cause the definite small stage-expansions at all times irrespective of the quantity of flow at different degrees of valve-opening, a minimum passage-area past flange "*d*" is provided, which will result in avoiding excessively larger passages past the flanges above "*d*" (between "*d*" and 14 and already open before the opening at "*d*") as the valve is opened, i. e., so much larger than at "*d*" at its initial opening, as to prevent the execution of my multi-stage method at the commencement of valve-opening when its beneficial action is most needed; for if the upper flange-passages above "*d*" should increase too rapidly in area as the valve is opened at "*d*" then the steam would rush past all the flanges, including sealing-flange 14, 24, from inlet-port to outlet-port, without the useful kind of multi-staging which accompanies the coincident maintenance upon valve-opening of the proper constructional design of the invention as shown in Fig. 1. The normal spacing from wall 13 of those of flanges 22 which lie between "*d*" and 14, in the closed position of the valve of Fig. 1, increases the need of the greatest care in the construction of all the flanges unless flange "*d*" is designed as a sealing-flange as in Fig. 1; and while the form of Fig. 4 is an operative embodiment of my invention, nevertheless, as above, the Fig. 1 form is preferred, for the above reason, i. e., the flange "*d*" is constructed as a second sealing flange additional to sealing-flange 14, 24; so that in a valve like Fig. 1 having a suitable angle of the wall of female member 13, as shown, relative to the number of flanges 22 and the total pressure-drop, between the valve-ports, the flanged male member may be designed as desired in accordance with the invention, for a given total pressure-drop, by proportioning the structure to such total drop, both as to the number of stages and as to the individual construction of each stage, and as to the angle of smoothly-continuous wall 13 as shown, which preserves such constructional proportioning for the various adjusted positions of the valve, particularly for small flange-passages as shown, so as to obtain any desired low order of stage-velocity at each and every stage substantially below the rate of velocity at which a given expansible fluid causes most rapid erosion; and if the total pressure-drop between the ports be substantially greater than the substantially large drop shown from 200 to 100 lbs., so as to require a greater number of stages in order to keep the velocity at each stage down to the desired low value, then the female member 13, with its proper angle shown, may be lengthened in order to accommodate such increased number of stage-flanges at the distance apart shown in Fig. 1; or if the included angle of the female member 13 be made larger without increasing its length, then the desired increased number of stage-flanges can be placed closer together inside member 13; or a combination of the above may be applied, i. e., that of increasing both the length of member 13 and the size of its included angle, and placing the increased number of stage-flanges at intermediate distances apart from one another. As shown in Figs. 1 and 4 however, the distances between the flanges are sufficient to form the expansion chambers 23 between them to have capacities substantially larger than the capacities of the flange-passages themselves, and therefore there is a limit to the inclusion of a number of flanges within a given length of a female member 13 having a given angle. The capacities of chambers 23 are not so critical as the relations of member 13 and 22, and it is sufficient as a practical matter when, as shown in Fig. 1, the capacities of chambers 23 are quite large relative to those of the flange flow-passages. These partial-expansion chambers 23 so shown are large enough to allow for the increases of steam-volumes consequent upon wider opening-adjustments of the valve; and being as large as that they have ample capacities to allow at each stage for the expansion-action in accord with the well-known laws governing the flow of steam thru an orifice with consequent expansion, i. e., to allow the dissipation in the chambers of the velocities of the partial stage-expansions, so that the operation as a whole is distinguished from that of a cone-valve having a long nozzle-like flow-passage not provided with my multi-staging wherein the velocity would build up progressively throughout the length of such long passage and reach a maximum at the orifice of several thousand feet per second; the operation here, on the other hand, being one of dissipating, at each stage, the velocity of the partial expansion thereat, so that the several velocities, altho necessarily rising at each stage-expansion, and of course in proportion to the expansion at each stage, nevertheless are kept down at each stage to a desired minimum, and such lower velocities are distributed throughout the several stages so that no velocity is permitted which would cause undesirably rapid erosion; altho of course only at and below a given total pressure-drop as an upper limit to which a given valve is designed for a given kind of expansible fluid. Thus the subject of erosion is put definitely under the control of the designer; and the supplemental flanges 22 of Fig. 1, with partial-expansion chambers 23, constituting my multi-stage structure, serve to protect the sealing-flanges 24, 14 and "*d*" from undesirably rapid erosion during all the time said sealing-flanges otherwise would be liable to erosion, i. e., from the time the valve is first opened until they are spaced substantial distances from member 13; and so, in Fig. 4 also, the flanges 22 (and expansion-chambers 23) serve to protect the sealing-flange which is at 24, 14 at the top next to outlet-port 12; and, of course, the multi-stage structure of Fig. 4 as in the case of Fig. 1, protects itself from undesirably rapid erosion at all times and in all adjusted positions of the valve even after the sealing-flange 24, 14 may have moved so far from female member 13 as to be no longer subject to erosion; provided that the angle of the smoothly continuous wall is such that at such times the flanges have not been moved so far away from such wall toward which they extend as to cause cessation of my multi-stage method, altho in such positions the flanges usually would be beyond the range where excessively rapid erosion would occur even in the absence of my multi-stage structure. In Fig. 1, however, the flanges 22 below the flange "*d*" (which is the first flange to act upon valve-opening) are provided for the purpose of continuing the multi-stage action as the valve is opened wider, i. e., toward the open position shown in Fig. 1, first above described as the action beginning with flange "*a*" in the position shown. This optional but desirable continuation of the multi-stage action to full extent, after the sealing-flange 24, 14 has been opened so wide as not to require further protection from erosion, has the useful effect of continuing to protect sealing-flange "*d*" from erosion, as well as the other and non-sealing flanges 22 above and below "*d*". For, even altho the sealing-flange 24, 14 may be so wide open as no longer to require protection from erosion at that particular valve-opening, as in the position of Fig. 1, yet it is important to prevent excessively rapid erosion at flanges 22 supplemental to sealing flange 14 and at the portions of wall 13 adjacent them, in order to preserve said surfaces in condition for their multi-stage action to protect the flange 24, 14 when later it is moved back closer to member 13. Hence in the position of adjustment to half-opening of sealing flange 24, 14 shown in Fig. 1, the multi-stage structure 13, 22, 23 is protecting itself from excessively rapid erosion as in Fig. 4 as above; altho such useful action will be present to a substantial extent in Fig. 1 even in the lack of the flanges below "*d*" for the same total pressure-drop between the valve-ports. If the valve of Fig. 1 be opened wider than the position shown therein, then the flanges below flange "*a*", in combination with flange "*a*" and with the other flanges 22 above flange "*a*" and yet inside member 13, will continue the multi-staging action in order fully to protect from erosion all the individual flanges 22 lying within female member 13 at any given valve-opening adjustment, and to protect from erosion the adjacent portion of the wall of female member 13. Such more or less ideal protection of the various flanges supplemental to sealing-flange 14 is all that is necessary in any substantially large valve-opening position such as that shown in Fig. 1, where the sealing-flange 14 is separated widely from its seat against wall 13; because in that position the sealing flange 14 is not subject to serious erosion. But until the valve is opened quite widely at sealing flange 14, the supplemental flanges 22 yet may be so close to wall 13 as to be rapidly eroded in the absence of the above self-protecting action of my multi-stage structure; that is, the multi-stage action in keeping the stage-pressures and stage velocities down to definite desired low values, is effected, not merely by successive flange-passages of progressively increasing flow-area to provide for flow of successively increasing volumes of steam at the successive expansion stages, but by successive flange-passages which definitely limit the expansion at each stage to a definite small amount which is accompanied by the desired low order of velocity causing substantially less rapid erosion at the valve-seal and at the other flanges than heretofore. As the valve is opened further upward beyond the position shown in Fig. 1, the upper flanges 22 open their stage-by-stage flow-areas until finally said upper flanges pass up and out of member 13, the flanges "*a*" and "*c*" in the position shown being replaced by the two flanges shown below flange "*a*". (As the valve of Fig. 1 is opened further upward, the pressure may build up at outlet-port 12 to above 100 lbs. and if the pressure of 200 lbs. be maintained at inlet-port 11, then the total pressure-drop will be less than from 200 to 100 lbs., and therefore the stage-drops of pressure will be smaller than noted in Fig. 1, and the stage-velocities lower than the above ideal of 570 feet, for steam; altho there will be no accompanying benefit of such lower velocity because as above I have found that erosion is substantially avoided at 570 feet, for steam.) But as to all the flanges 22 at any one time lying within member 13, as well as sealing-flange 14, each and all of them cooperate with one another in protecting each of the others against undesirably rapid erosion, provided that, as first above stated, the stage-velocities at each stage are kept substantially below the rate at which a given expansible fluid causes undesirably rapid erosion. In the form shown in Fig. 4, where upon adjusting valve-movements, there is no movement of flanges supplemental to sealing-flange 24, 14, the tapered non-flanged male member extends so far below the lowest flange 22 next to inlet-port 11, that as the valve is opened to wider positions of adjustment the smoothly continuous wall of the male member continues to cooperate with flanges 22 on the female member 13 so that my specific multi-stage method is continued for the purpose of protecting from erosion the male and female members including flanges 22, quite irrespective of any protection of sealing flange 24, 14 by the multi-staging, so that the structure 13, 22, 23 of Fig. 4 may be employed for throttling while flange 14 is employed only as a sealing flange. As to Fig. 1 and the illustrated total pressure-drop from 200 to 100 lbs. in the half-open valve adjustment shown for example; when the valve is first adjusted to an open position from its closed position, the total pressure-drop may be larger than said 100 lb. drop, even assuming the boiler pressure at inlet-port 11 to continue at 200 lbs.; because initially the pressure at outlet-port 12 may be below 100 lbs., and therefore upon initial valve-opening the stage-expansions may be somewhat larger than as indicated in Fig. 1, and the stage velocities therefore somewhat higher than the ideal 570 feet for steam; but that will not be accompanied by objectionably rapid erosion either of sealing-flange 14 or of any of the supplemental flanges 22, provided that in accordance with the invention the stage-velocities yet are kept substantially below the rate at which erosion is objectionably rapid. And if it be desired to provide a valve according to the invention, which will keep the stage-velocities down to the ideal of 570 feet, for steam, at higher total pressure-drops than that from 200 to 100 lbs. above described as to Fig. 1 by way of example, (as upon a larger total pressure-drop at initial valve-opening), then that desire can be realized according to the invention, by increasing the number of stages in proportion to such larger total pressure-drop, with any other relative proportioning as above including the design of the individual stages, the length of female member 13 and the included angle of its smoothly continuous wall, the spacing of the flanges from one another, and the relative areas of the successive passages between the flanges and the wall 13.

Fig. 1 illustrates very special conditions, as follows. In any valve having an ordinary sealing-flange such as the short cone-flange 14 or the disk-flange 24, or the common combination of both 24 and 14 as shown, the velocity past such short valve-seal is approximately 1675 feet per second, for steam, for any pressure-drop, no matter how great, past such short cone-flange, (in the absence of my multi-stage structure 13, 22, 23 proportioned to a given total pressure drop between the valve-ports), provided that the pressure at outlet-port 12 is less than 58 per cent. (for steam) of the pressure at inlet-port 11. Thus in the example, where the total pressure-drop between ports is from 200 to 100 lbs., the latter pressure at outlet-port 12 is less than 58% of the 200 lbs. pressure at inlet-port 11 and therefore the velocity (for steam) past a flange like 24, 14 for that pressure-drop (in the absence of 13, 22, 23) would be 1675 feet per second.

Another very special condition also is illustrated in Fig. 1, as follows. In adding my multi-stage structure to the ordinary valve-seal as 24, 14 it was necessary to provide the female member 13 of much greater length than its portion which is engaged by short tapered sealing-flange 14, as is shown, and it was necessary at least correspondingly to lengthen the male member, of either Fig. 1 or 4. In the absence of flanges 22 and their multi-stage action, and with the annular conical passage between such male and female members, a steam nozzle thereby would be provided which would be almost ideal for converting the total pressure-drop into maximum velocity at the orifice such as 13, 14, as in steam-nozzle construction; and at the illustrated 200 to 100 lb. drop, the velocity of steam-flow past the orifice 13, 14 of such nozzle would be approximately 1675 feet, i. e., substantially the same as above for the same pressure-drop of 200 to 100 lbs. past 13, 14 in the absence of such long nozzle formed between the long male and female members, and in the presence only of short flange 14 and its seat-portion of member 13. But notwithstanding such identity of velocities for said two forms of valve, (lacking 13, 22, 23), i. e., respectively with a short and with a long valve-passage, the two cases are different because in the case of the above long cone-valve the velocities of expansion for pressure-drops larger than the 200 to 100 lb. drop illustrated, would increase above 1675 feet (for steam) with such increases of the pressure-drops, i. e., the velocities would increase in direct proportion to the increases of energy in such larger pressure-drops which energy is converted into velocity, as above. For example, if the pressure-drop were from the 200 lbs. at inlet port 11 to atmosphere at outlet-port 12, then the velocity at orifice 14, 24 of such long cone-valve passage (lacking 13, 22, 23) would be about 3000 feet per second, for steam. But on the other hand, in the above short cone-valve, as at 14, Fig. 1, (lacking 13, 22, 23) the steam velocity never would exceed 1675 feet per second no matter how large the pressure-drop might be, and the steam velocity never would be lower than 1675 feet per second until the pressure on the outlet-port of said short passage rises above 58% of the pressure on the inlet-port side of said short passage. Hence, in order to accomplish one of the objects of the invention, i. e., reducing erosion at sealing passage 13, 14, 24, 25 by preventing undesirably high velocity of fluid passing thru it, there is provided, in effect, in my construction, a long nozzle-like valve-passage between the male and female members, at the final orifice at 13, 14, 24, 25 of which long passage, the steam velocity for large pressure-drops larger than the example of 200 to 100 lbs. would rise to thousands of feet per second in long cone-valves as heretofore constructed; but the provision of my multi-stage structure supplementing and cooperating with the short cone-passage past the valve-seal 13, 14, 24, 25 prevents the velocities from rising there or at any other part of the valve, to values even as high as the stated steam velocity of 1675 feet per second (not to mention said higher velocities up to thousands of feet) which as above is that which would accompany the particular pressure-drop from 200 to 100 lbs. or any larger total pressure-drop between the valve-ports, in the lack of multi-stage structure 13, 22, 23 and whether or not, for any such large total pressure-drop, the entire valve-passage were short as at 14, or long as between the long conical male and female members shown, but lacking flanges 22.

As illustrated by the construction of Fig. 1, a valve having ten steps and properly proportioned to a given maximum total pressure-drop not only is useful in reducing erosion over a reasonably wide range of adjusted positions by stem 15 for different rates of quantity flow, as described above, but it is useful also in reducing erosion over a wide range of different total pressure-drops between its ports 11, 12, which drops are substantially at, and below, such given upper limit for which any valve within the invention is designed for the desired extent of erosion-reduction. First; the exact valve of Fig. 1 is useful, not only at the 200 to 100 lb. drop at which its operation was described first above, but also of course at all smaller pressure-drops, even almost as small as the pressure-drop per step in Fig. 1, because at all such lower drops the velocity per stage would be even lower than 570 feet, for steam. And on the other hand the exact valve of Fig. 1 properly proportioned may be useful in reducing erosion (altho not to as great a degree) at total pressure drops substantially greater than the 200 to 100 lb. drop above described. All this is because it is not necessary to keep the velocity per step down as low as the 570 feet, for steam. For example, assume a given boiler pressure of 200 lbs. at 11 and a pressure of 80 lbs. at 12, i. e., a total drop of 120 lbs.; and the average velocity per step will be 800 feet, for steam, i. e. a useful reduction of erosion. Again, assume a pressure of only 50 lbs. at 12, and a total drop of 150 lbs.; and the average velocity per step will be 1200 feet, for steam, yet a useful reduction of erosion. Furthermore, not only is it unnecessary, in order to reduce erosion usefully by means of the invention, to keep the velocity per step as low as 570 feet, for steam, but it is unnecessary even to keep the velocity below 1675 feet, for steam. For example in the exact valve of Fig. 1, even if the total pressure-drop were so large as to cause a steam velocity of exactly 1675 feet at each step, or even higher, that velocity yet would be so much lower than the several thousands of feet per second which would accompany so large a pressure-drop if effected in a single step thru the entire length of the long passage between the male and female members as in an ordinary long-cone valve, i. e., in the absence of flanges 22, that the rate of erosion would be very greatly reduced indeed, as compared with such ordinary long-cone-valve; for the reason that I have found that the rate of erosion varies as the square of the velocity and in direct proportion to the density of any given expansible fluid. For example, consider a valve having the same number of steps as in Fig. 1 and properly designed in accordance with the invention to handle a total pressure-drop from 3500 lbs. at inlet-port 11 to atmosphere at outlet-port 12 (a total drop of 3485 lbs.) when the velocity, for steam, would increase from 1675 feet per second at the inlet-throat of the nozzle-passage between the male and female members of an ordinary cone-valve, to 3000 or 4000 feet at the nozzle-outlet, the provision of proper flanges 22 in such a long-cone valve would keep the velocity from rising at any part of the valve above the 1675 feet which is the normal minimum velocity thru short-passages, so that the erosion would be very greatly reduced. The calculations of such conditions, paralleling the rotation on Fig. 1 as to step-pressure, is as follows. At the first step or as the result of the first expansion, past the flange 22 next to inlet-port 11 which is first to act, the pressure will be 2049 lbs.; second step, 1180 lbs.; third step, 685 lbs.; fourth step, 396 lbs.; fifth step, 230 lbs.; sixth step, 132 lbs.; seventh step, 77 lbs.; eighth step, 45 lbs.; ninth step, 26 lbs. tenth step, 15 lbs. Thus a valve with no more than the ten acting steps as in Fig. 1, and properly proportioned in accordance with my invention is useful in reducing erosion at as large a pressure-drop as 3485 lbs. and of course at smaller pressure-drops; altho of course the reduction of erosion in the same valve is greater at smaller pressure-drops than at that very large drop.

While I have described and indicated in the drawings a proportioning of parts which will cause the steam to flow past each of the several flanges at a corresponding velocity (570 feet per second), I wish to have it understood that this particular proportioning is not essential to my invention. The velocity of the steam flowing past one flange may be more or less than that flowing past a neighboring flange, provided, however, that the male and female members are proportioned to prevent undue rise of the velocity by reducing the pressure in substantial accord with the method above described.

This invention is based on consideration of the long-known special thermodynamic laws of De Laval and Napier as will be understood clearly by those skilled in the art. The valve of this invention is distinguished from all prior valves in that its construction and operation embody principles analogous to those of the long-known steam turbines wherein multi-stages are employed for the purpose of preventing the turbine rotor carrying the blades from attaining undesirably high rates of rotation which would necessitate speed-reducing gearing between the rotor and the parts driven by it, such as ship's propellers, etc.

The valves hereof operate with elastic fluids as above described when they are supplied with a hot liquid under high pressure, such as hot water blowing off from a steam boiler or hot oil which similarly has been confined under high pressure during heating in refinery processes. When such a hot liquid under high pressure is supplied to a valve hereof and to its successive partial expansion chambers, the pressure on the hot liquid is released and its heat causes more or less of the liquid to flash into gas or vapor at each expansion chamber, such gas or vapor then expanding and the valve-construction then operating to prevent undue erosion by limiting the expansion and rate of flow of the gas or vapor.

I claim:

1. A valve comprising a fixed part and an adjustable part forming between them a flow-passage increasing in flow-area toward its outlet, said passage being provided with several expansion receiving chambers intermediate the valve inlet and outlet, said chambers being formed by flanges of less depth at their edges than the depth of the chamber space between them, said flanges being of increasing but limited separation between their edges and the opposite part of said valve in the direction of fluid travel as said adjustable valve-part is moved from its valve-closing position.

2. An erosion-reducing expansible-fluid valve which includes co-axial male and female members of which the female member has a larger opening toward the outlet-port, one of said male and female members having a smoothly continuous wall extending intermediate the inlet and outlet ports; and two or more annular flanges extending radially toward said smoothly-continuous wall from the other member, successive flanges forming an expansion-chamber between themselves and said wall, and at least one of said flanges extending into contact with said wall in the closed condition of the valve, thereby as a sealing-flange determining said closed position; said male and female members being relatively adjustable co-axially causing simultaneous increases of the areas of the flow-passages past both and/or all said two or more flanges as the valve is opened at the sealing-flange; said smoothly-continuous wall of one of the male and female members being arranged relative to the axis of adjustment at an angle coincidentally preserving substantially constant the relative ratios of said passage-areas over a limited but substantially wide range of adjusted positions of the flanges close to said wall; the number of said two or more flanges, including the sealing-flange, and the construction of each flange relative to said wall and its adjacent flange, having relations to one another and to a desired large total pressure-drop between the valve-ports which limit, the expansion past each flange, at total pressure-drops within a substantially wide range, to an expansion accompanied by a velocity below the rate by natural law accompanying the total expansion in a single step between said male and female members; all whereby the successive flanges including the sealing-flange cooperate with one another and with said smoothly continuous wall at all pressure-drops within said range of pressure-drops, in reducing erosion of said smoothly-continuous wall and of each of the flanges at various of the adjusted positions of the flanges close to the wall where erosion would be more rapid if the velocities were not so limited at each of said flanges and at each of said various adjusted positions within said range of positions.

3. An erosion-reducing expansible-fluid valve which includes co-axial male and female members of which the female member has a larger opening toward the outlet-port and a smoothly continuous interior wall extending intermediate the inlet and outlet ports; and two or more annular flanges carried by said male member and extending radially outward toward said smoothly continuous wall of the female member, successive flanges forming an expansion-chamber between themselves and said wall, and at least one of said flanges extending into contact with said wall of the female member in the closed condition of the valve, thereby as a sealing-flange determining said closed position; said male and female members being relatively adjustable co-axially causing simultaneous increases of the areas of the flow-passages past both and/or all said two or more flanges as the valve is opened at the sealing-flange; said smoothly continuous wall of the female member being arranged relative to the axis of adjustment at an angle coincidently preserving substantially constant the relative ratios of said passage-areas over a limited but substantially wide range of adjusted positions of the flanges close to said wall; the number of said two or more flanges, including the sealing flange, and the construction of each flange relative to said wall and its adjacent flange, having relations to one another and to a desired total large pressure-drop between the valve-ports, which limit, the expansion past each flange, at total pressure drops within a substantially wide range to an expansion accompanied by a velocity below the rate by natural law accompanying the total expansion in a single step between said male and female members; all whereby the successive flanges, including the sealing-flange, cooperate with one another and with said smoothly continuous wall, at all pressure-drops within said range of pressure-drops, in reducing erosion of said wall of the female member and of each of the flanges, at various of the adjusted positions of the flanges close to the wall where erosion would be more rapid if the velocities were not so limited at each of said flanges and at each of said various adjusted positions within said range of positions.

4. An erosion-reducing expansible-fluid valve which includes co-axial male and female members of which the female member is formed with a larger opening toward the outlet-port, at least one of said male and female members being formed with a smoothly continuous tapered wall extending intermediate the inlet and outlet-ports; and two or more annular flanges extending radially toward said tapered wall from the other member, forming an expansion-chamber between themselves and said wall, and at least one of said flanges extending into contact with said wall in the closed condition of the valve, thereby as a sealing-flange determining said closed position; said male and female members being relatively adjustable co-axially causing simultaneous increases of the areas of the flow-passages past both and/or all said two or more flanges as the valve is opened at the sealing-flange; said smoothly-continuous wall of one of the male and female members being arranged relative to the axis of adjustment at an angle coincidently preserving substantially constant the relative ratios of said passage-areas over a limited but substantially wide range of adjusted positions of the flanges close to said wall; the number of said two or more flanges, including the sealing-flange, and the construction of each flange relative to said wall and its adjacent flange, having relations to one another and to a desired large total pressure-drop between the valve-ports, which limit, the expansion past each flange, at total pressure-drops within a substantially wide range to an expansion accompanied by a velocity below the rate by natural law accompanying the total expansion in a single step between said male and female members; all whereby the successive flanges including the sealing-flange cooperate with one another and with said smoothly continuous wall at all pressure-drops within said range of pressure-drops, in reducing erosion of said smoothly-continuous wall and of each of the flanges at various of the adjusted positions of the flanges close to the wall where erosion would be more rapid if the velocities were not so limited at each of said flanges and at each of said various adjusted positions within said range of positions.

5. An erosion-reducing expansible-fluid valve which includes co-axial male and female members of which the female member is formed with a larger opening toward the outlet-port, one of said male and female members being formed with a smoothly-continuous wall extending intermediate the inlet and outlet ports; and two or more annular flanges extending radially toward said smoothly-continuous wall from the other member and with said wall forming short flow-passages in open positions of the valve, successive flanges forming an expansion-chamber between themselves and said wall, and at least one of said flanges extending into contact with said wall in the closed condition of the valve, thereby as a sealing-flange determining said closed position; said male and female members being relatively adjustable co-axially causing simultaneous increases of the areas of the flow-passages past both and/or all said two or more flanges as the valve is opened at the sealing-flange; said smoothly-continuous wall being arranged relative to the axis of adjustment at an angle coincidently preserving substantially constant the relative ratios of said passage-areas over a limited but substantially wide range of adjusted positions of the flanges close to said wall; the number of said two or more flanges, including the sealing-flange, and the construction of each flange relative to said wall and its adjacent flange, having relations to one another and to a given desired large total pressure-drop between the valve-ports, which limit, the expansion at each flange, at all total pressure-drops within a substantially wide range, to an expansion accompanied by a velocity below the rate by natural law accompanying the total expansion in a single step between said male and female members.

6. An erosion-reducing expansible-fluid valve which includes a sealing-flange and co-axial male and female members; said female member having a larger opening toward the outlet-port, one of said male and female members having a smoothly-continuous wall extending intermediate the inlet and outlet-ports; and two or more annular flanges additional to said sealing-flange and extending radially toward said wall from the other member, each succession of two units of said additional flanges forming an expansion-chamber between themselves and said wall; said male and female members being relatively adjustable co-axially causing simultaneous increases of the areas of the flow-passages past both and/or all said two or more additional flanges as the valve is opened at the sealing-flange; means simultaneously adjusting said sealing-flange and said relatively adjustable male and female members and additional flanges; said smoothly-continuous wall of one of the male and female members being arranged relative to the axis of adjustment of the male and female members, at an angle preserving substantially constant the relative ratios of the areas of the flow-passages past the additional flanges, in various adjusted positions of the additional flanges close to said smoothly-continuous wall; the number of said additional flanges and the construction of each of them relative to its adjacent flange and to said smoothly-continuous wall, having relations to one another and to a given desired large total pressure-drop between the valve ports, which limit, the expansion past each additional flange, at all total pressure-drops within a substantially wide range, to one accompanied by a velocity below the rate by natural law accompanying the total expansion in a single step between said male and female members; all whereby the successive additional flanges co-operate with one another, at all total pressure-drops within said range of total pressure-drops, in reducing erosion of said smoothly-continuous wall and of each of the additional flanges at various of the adjusted positions of the male and female members when the additional flanges are close to the wall and in which positions the rates of velocity and erosion would be more rapid if the velocities were not so limited at each of said various adjusted positions of the additional flanges within said range of positions.

7. An erosion-reducing expansible-fluid valve which includes co-axial male and female members of which the female member is formed with a larger opening toward the outlet-port, one of said male and female members having a smoothly-continuous wall extending intermediate the inlet and outlet ports; and two or more annular flanges extending radially toward said smoothly-continuous wall from the other member, successive flanges forming an expansion-chamber between themselves and said wall; said male and female members being relatively adjustable causing simultaneous increases of the areas of the flow-passages as the valve is opened; said smoothly-continuous wall being arranged relative to the axis of adjustment at an angle coincidently preserving substantially constant the relative ratios of said passage-areas over a limited but substantially wide range of adjusted positions of the valve close to said wall; the number of said two or more flanges and the construction of each flange relative to said wall and its adjacent flange, having relations to one another and to a desired large total pressure-drop between the valve-ports, which limit, the expansion past each flange, at all total pressure-drops within a substantially wide range, to one accompanied by a velocity below the rate by natural law accompanying the total expansion in a single step between said male and female members; said male member, in the closed condition of the valve, extending thru and beyond the smaller end of the female member toward the inlet-port thereby constituting means preserving the same number of expansion-stages acting within the female member for various positions of valve-opening.

8. An erosion-reducing expansible-fluid valve which includes co-axial male and female members and a disk sealing-flange arranged as a valve-stop, the female member being formed with a larger opening toward the outlet port and with a smoothly-continuous interior wall extending intermediate the inlet and outlet ports; and two or more annular flanges carried by said male member and extending radially outward toward said smoothly-continuous wall of the female member, successive flanges forming an expansion-chamber between themselves and said wall, and at least one of said flanges extending into contact with said wall of the female member in the closed condition of the valve, thereby as a sealing-flange determining said closed position; said male and female members being relatively adjustable co-axially causing simultaneous increases of the areas of the flow-passages past both and/or all said two or more flanges as the valve is opened at the sealing-flange; said smoothly continuous wall of the female member being arranged relative to the axis of adjustment at an angle coincidently preserving substantially constant the relative ratios of said passage-areas over a limited but substantially wide range of adjusted positions of the flanges close to said wall; the number of said two or more flanges, including the sealing flange, and the construction of each flange relative to said wall and its adjacent flange, having relations to one another and to a desired total large pressure-drop, between the valve-ports, which limit, the expansion past each flange, at total pressure-drops within a substantially wide range to an expansion accompanied by a velocity below the rate by natural law accompanying the total expansion in a single step between said male and female members; all whereby the successive flanges, including the sealing-flange, cooperate with one another and with said smoothly-continuous wall, at all pressure-drops within said range of pressure-drops, in reducing erosion of said wall of the female member and of each of the flanges, at various of the adjusted positions of the flanges close to the wall where erosion would be more rapid if the velocities were not so limited at each of said flanges and at each of said various adjusted positions within said range of positions.

9. An erosion-reducing steam-valve which includes a step-by-step expansion structure including relatively adjustable male and female members and flanges carried by one of them and extending toward the other, the latter having a smoothly-continuous wall having relations to said flanges maintaining substantially constant over a limited but substantially wide range of valve-adjustments, the ratios of the areas of the short flow-passages at the successive steps; said structure having relations to a given desired large total pressure-drop, which limit, the velocity of the steam at each expansion step to a desired rate below the rate of about 1675 feet per second which by natural law would accompany the total expansion in a single step between the valve-ports.

10. An erosion-reducing expansible-fluid valve which includes a step-by-step expansion structure comprising relatively adjustable male and female members and flanges forming flow-passages which simultaneously increase in flow-areas at substantially the same ratio for valve-adjustments of the flanges within a wide range near the closed condition of the valve-seal, said structure having relations to a given large total desired pressure-drop which limit the velocity of the fluid at each step to a desired rate within a range below the rate by natural law accompanying the total pressure-drop in a single step between said male and female members.

11. A method of controlling erosion of a valve effectuating large pressure-drops of an expansible fluid, which consists in effecting such pressure-drop in a step-by-step manner at various different positions of valve-adjustments within a range wherein the valve is throttling the fluid, and in such small amounts of expansion at each step that the pressure at each step is high enough to keep the expansion at each step low enough to keep the velocity at each step at some desired rate within a range below the velocity by natural law accompanying the same total pressure-reduction in a single step of expansion.

12. A valve in which erosion by a given expansible fluid is controlled at various desired adjusted positions of the valve for throttling the given fluid, such valve including means limiting velocities at various pressure-drops of the fluid thru the valve thruout a substantially wide desired range of pressure-drops, and at various positions of valve-adjustment within a desired range of extents of valve-opening-adjustment; said velocity-limiting means including a special stage-by-stage expansion structure which maintains the velocity at each stage at a rate within a range of velocities below the rate by natural law accompanying the total pressure-drop in a single step between the ports of the valve.

13. The method of controlling erosion in a valve, caused by a given expansible fluid, at various adjusted positions of the valve for throttling such fluid, which consist in limiting velocities caused at various pressure-drops of the given fluid thru the valve thruout a substantially wide desired range of pressure-drops, and at various positions of valve-adjustment within a desired range of valve-openings; said velocity limitation being effected by the special step-by-step method of effecting the total expansion thru the valve which consists in maintaining the velocity at each expansion step, and at each of the total pressure-drops within said range of total pressure-drops, at a rate within a range of velocities below the rate by natural law accompanying any of said total pressure-drops in a single step between the ports of the valve.

14. The method of reducing the erosion of a valve as heretofore caused by a large pressure-drop of a given expansible fluid between the valve-ports, which consists, as to such large pressure-drop at various positions of valve-adjustment at which rapid erosion would occur if such pressure-drop were effected in a single expansion-step between the valve-ports, in effecting such pressure-drop in a step-by-step manner, keeping the pressure at each step high enough to keep the expansion at each step low enough to keep the velocity at each step down to a rate within a range below the rate by natural law accompanying the total pressure-drop in a single step between the ports of the valve.

15. The method of reducing erosion in a valve as heretofore caused by the expansion of a given expansible fluid between its ports, which consists in effecting any pressure-drop within a substantially wide range in a step-by-step manner, keeping the pressure at each step high enough, at each of the total pressure-drops within said range, to limit the expansion at each step to a pressure-drop small enough, at each of the total pressure-drops within said range, to keep the velocity at each of said steps, and at each of the total drops within said range, within a range of rate of velocities below the rate by natural law accompanying the total pressure-drop in a single step between the ports of the valve.

16. A valve for controlling a given expansible fluid, the same being adjustable by the user to vary the rate of quantity-flow and constructed to cause reduction of erosion within a substantially wide range of pressure-drops between the valve-ports, said valve being provided with means which, at various open positions of the valve within a limited range adjustment for substantially different rates of quantity-flow of the given fluid, and at substantially large pressure drops between the valve-ports within a substantially wide range of pressure-drops for which a given valve is particularly constructed for use with the given fluid, maintains the velocity of the given fluid at all parts of the valve at a rate within a range below that by natural law accompanying the total pressure-drop in a single step between the ports of the valve.

17. The method of preventing rapid erosion of an expansible-fluid valve by high velocity of the expanding fluid, which consists in increasing the rate of quantity-flow with the opening of the valve seal from its closed position as desired, and in effecting the total pressure-drop at any adjustment otherwise accompanied by a higher rate of erosion, by a succession of partial expansion steps at each of which the expansion is low enough to keep the pressure at each step high enough to keep the velocity at each step within a range, over a range of total pressure-drops, below the velocity by natural law accompanying the total expansion in a single step between the ports of the valve.

18. A valve construction preventing undesirably rapid erosion by high velocities of expansible fluids, which includes a step-by-step expansion structure including relatively adjustable male and female members and flanges by which the rate of quantity-flow is varied with the opening of the valve-seal from its closed position, and in which step-by-step structure the expansion at each step is limited, and the velocity at each step thereby kept within a range, over a range of total pressure-drops, below the velocity by natural law accompanying the total expansion in a single step between the ports of the valve.

19. A valve construction preventing undesirably rapid erosion by high velocities of expansible fluids, which includes a step-by-step expansion structure including relatively adjustable male and female members and two or more flanges at least two of which are valve-sealing flanges, and by which structure the rate of quantity-flow is varied with the opening of said valve-seals from their closing positions, and in which step-by-step structure the expansion at each step thereby is limited and the velocity at such step kept within a range, for a range of total pressure-drops, below the velocity by natural law accompanying the total expansion in a single step between the ports of the valve.

20. The erosion-reducing improvement upon a valve of the long-cone type having long relatively adjustable male and female members which in open valve-positions define a long annular passage of progressively increasing flow-area between the valve-ports, said improvement comprising a construction including expansion-receiving chambers intermediate the valve-ports, said chambers being formed by flanges extending in a direction across said long annular passage from one of said relatively adjustable members toward the other, each flange defining a relatively short passage preventing rise of velocity past a preceding flange to a rate exceeding that according to the general law of expansion thru short passages approximating thin-plate orifices; at least one of said flanges in the closed condition of the valve engaging the wall of the valve-member toward which it extends, but said male-member defining a line having in general a sharper angle of taper than the female member relative to the axis of adjustment, whereby in the closed condition of the valve the rest of said flanges are spaced slightly from the wall of the member toward which they extend.

21. The erosion-reducing improvement upon a valve of the long-cone type having long coaxially adjustable male and female members which in open positions of the valve define a long annular passage of progressively increasing flow-area between the valve-ports, said improvement including a construction which prevents the velocity of a fluid expanding between the valve-ports from rising to the order according to the general law of expansion thru short passages approximating thin-plate orifices, said construction including flanges constructed at their periferies with short lengths relative to the length of said long female member, said flanges extending radially toward one of said male and female members and carried by the other for valve-adjustment to different rates of quantity-flow, successive flanges defining correspondingly short annular passages and defining a short chamber for reception of partially expanded fluid, said short chamber and short passages replacing the ordinary long passage between the long male and female members; and said flanges thru a range of valve-adjustment beginning with its initial opening from closed position, defining narrow widths for said short passages preventing the velocity of flow past any flange, within said range of adjusted valve-positions, from rising past such flanges as high as if only one of such flanges were interposed across the long passage between the valve-ports of a long-cone valve.

22. The erosion-reducing improvement upon a valve of the long-cone type having long relatively adjustable male and female members which in open positions of the valve define a long annular passage of progressively increasing flow-area between the valve-ports, said improvement including a construction which at various positions of valve-opening prevents the velocity of a fluid expanding between the valve-ports from rising to the high order according to the general law of expansion thru long passages as distinguished from thin-plate orifices, said construction including flanges constructed at their periferies with short lengths relative to the length of said long female member, said flanges extending radially toward one of said male and female members and carried by the other for valve-adjustment to different rates of quantity-flow, successive flanges defining correspondingly short annular passages and defining a short chamber for reception of partially expanded fluid, said chamber and short passages replacing the ordinary long passage between the long male and female members; and said flanges thru a range of valve adjustment beginning with its initial opening from closed position, defining narrow widths of said short passages preventing the velocity of flow past any flange within said range of adjusted valve positions from rising between the male and female members as high as if such flanges were not provided.

23. The novel erosion-reducing means for expansible-fluid valves of the type having a casing with a long conical female member and a stem, said means consisting of a long conical male member for cooperation with such casing and stem said male member being formed with flanges which in various positions of stem-adjustment prevent the pressure from falling and the velocity from rising according to the law of expansion between such long conical male and female members in the lack of such flanges.

24. The method of reducing erosion of a valve by a fluid expanding between the valve ports, which consists in preventing the velocity of the expanding fluid from rising to the high order according to the laws of fluid expansion thru valve passages, by effecting the total pressure-drop between the valve-ports in a step-by-step manner, including at least two steps, and in any of various positions of valve-adjustment for correspondingly different rates of quantity flow, beginning with the opening of the valve from its closed position, in which positions of valve-adjustment the velocity would rise to said high order if said total expansion between the valve-ports were effected in a single step.

In testimony whereof, I have hereunto set my hand this 18th day of July, 1929.

HENRY B. LEE.